(12) United States Patent
Sharma et al.

(10) Patent No.: US 10,979,496 B2
(45) Date of Patent: Apr. 13, 2021

(54) IOT PARTITION MANAGEMENT AND LOAD BALANCING

(71) Applicant: Microsoft Technology Licensing, LLC, Redmond, WA (US)

(72) Inventors: Vaibhav Sharma, Seattle, WA (US); Kapil Agarwal, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 74 days.

(21) Appl. No.: 16/378,207

(22) Filed: Apr. 8, 2019

(65) Prior Publication Data
US 2020/0322425 A1 Oct. 8, 2020

(51) Int. Cl.
*H04L 29/08* (2006.01)
*H04L 12/26* (2006.01)

(52) U.S. Cl.
CPC ........ *H04L 67/1031* (2013.01); *H04L 43/10* (2013.01); *H04L 67/1029* (2013.01); *H04L 67/1095* (2013.01); *H04L 67/1034* (2013.01)

(58) Field of Classification Search
None
See application file for complete search history.

(56) References Cited

U.S. PATENT DOCUMENTS

| | | | |
|---|---|---|---|
| 8,028,020 B2 | 9/2011 | Huck et al. | |
| 9,471,585 B1* | 10/2016 | Theimer | G06F 3/0641 |
| 9,639,589 B1* | 5/2017 | Theimer | G06F 11/1453 |
| 9,923,821 B2 | 3/2018 | Nolan et al. | |
| 10,097,379 B2 | 10/2018 | Nolan et al. | |
| 2004/0117386 A1* | 6/2004 | Lavender | H04L 29/06 |
| 2004/0117666 A1* | 6/2004 | Lavender | H04L 29/12132 726/6 |
| 2004/0117667 A1* | 6/2004 | Lavender | G06F 21/31 726/6 |
| 2009/0100436 A1 | 4/2009 | Adya et al. | |
| 2014/0136878 A1 | 5/2014 | Narayanan et al. | |
| 2015/0156266 A1 | 6/2015 | Gupta | |
| 2017/0163495 A1 | 6/2017 | Kurian et al. | |
| 2019/0140933 A1 | 5/2019 | Guim Bernat et al. | |

(Continued)

OTHER PUBLICATIONS

"International Search Report and Written Opinion Issued in PCT Application No. PCT/US20/022516", dated Jun. 9, 2020, 14 Pages.

(Continued)

*Primary Examiner* — Davoud A Zand
(74) *Attorney, Agent, or Firm* — Buckley, Maschoff & Talwalkar LLC

(57) ABSTRACT

A system includes a plurality of servers, a control plane to determine a first partition of a plurality of devices and to determine a subset of the plurality of servers to assign as candidate servers for the first partition, and a common data store comprising a first stream and a second stream. The control plane is to store, in the first stream, a first message indicating the first partition, the candidate servers, the second stream, and a first message tag, the candidate servers elect a primary server of the first partition from the candidate servers using the first stream, and the elected primary server inserts read and write updates associated with the plurality of devices of the first partition into the second stream.

20 Claims, 12 Drawing Sheets

(56) References Cited

U.S. PATENT DOCUMENTS

2020/0304401 A1   9/2020   Gandhi et al.

OTHER PUBLICATIONS

Berdy, Nicole, "IoT Hub Message Routing: Now with Routing on Message Body", Retrieved from: <<https://azure.microsoft.com/en-in/blog/iot-hub-message-routing-now-with-routing-on-message-body/>>, May 31, 2017, 5 Pages.

Burgstahler, Lars et al., "New Modifications of the Exponential Moving Average Algorithm for Bandwidth Estimation", In Proceeding of the 15th ITC Specialist Seminar, Jul. 2002, 10 Pages.

Cheung, et al., "Using Destination Set Grouping to Improve the Performance of Windowcontrolled Multipoint Connections", In Proceedings of the 4th International Conference on Computer Communications and Networks, Sep. 20, 1995, pp. 388-395.

Pavitrakar, Vrushali et al., "Vehicular Messaging in IOT Using Epidemic Routing", In International Journal of Computer Applications Technology and Research, vol. 5, Issue 3, Mar. 2016, pp. 137-140, 4 total pages.

"Non Final Office Action Issued in U.S. Appl. No. 16/361,417", dated Jul. 29, 2020, 11 Pages.

"International Search Report and Written Opinion Issued in PCT Application No. PCT/US20/024802", dated Oct. 13, 2020, 14 Pages.

* cited by examiner

P1; curr_ow: null; new_ow: null;
curr_etag: null; new_etag: e1; DataStrm: DS1

P1; curr_ow: null; new_ow: null;
curr_etag: null; new_etag: e1

P1; curr_ow: null; new_ow: null;
curr_etag: null; new_etag: e1; DataStrm: DS1

P1; curr_ow: null; new_ow: null;
curr_etag: null; new_etag: e1

P1; curr_ow: null; new_ow: S1;
curr_etag: e1; new_etag: e2; DataStrm: DS1

IOT PARTITION MANAGEMENT AND LOAD BALANCING

BACKGROUND

Conventional Internet of Things (IoT)-enabled systems receive and process data from hundreds, thousands or more individual IoT devices. Such systems may provide a fleet of servers to handle the processing load generated by the IoT devices. The devices may be grouped into several partitions in order to distribute the load, with each partition being assigned to a particular server. A connected device may therefore be reached based on its partition assignment.

In some implementations, hundreds of servers are each available to handle the load from thousands of partitions. Current protocols are unable to efficiently elect a primary server to handle the load from a given partition at this scale. This problem is exacerbated if one or more relatively up-to-date (i.e., "warm") secondary servers are also desired for each partition. Also desired are systems to maintain a sustainable load level per server at scale.

DETAILED DESCRIPTION

Figure 1:
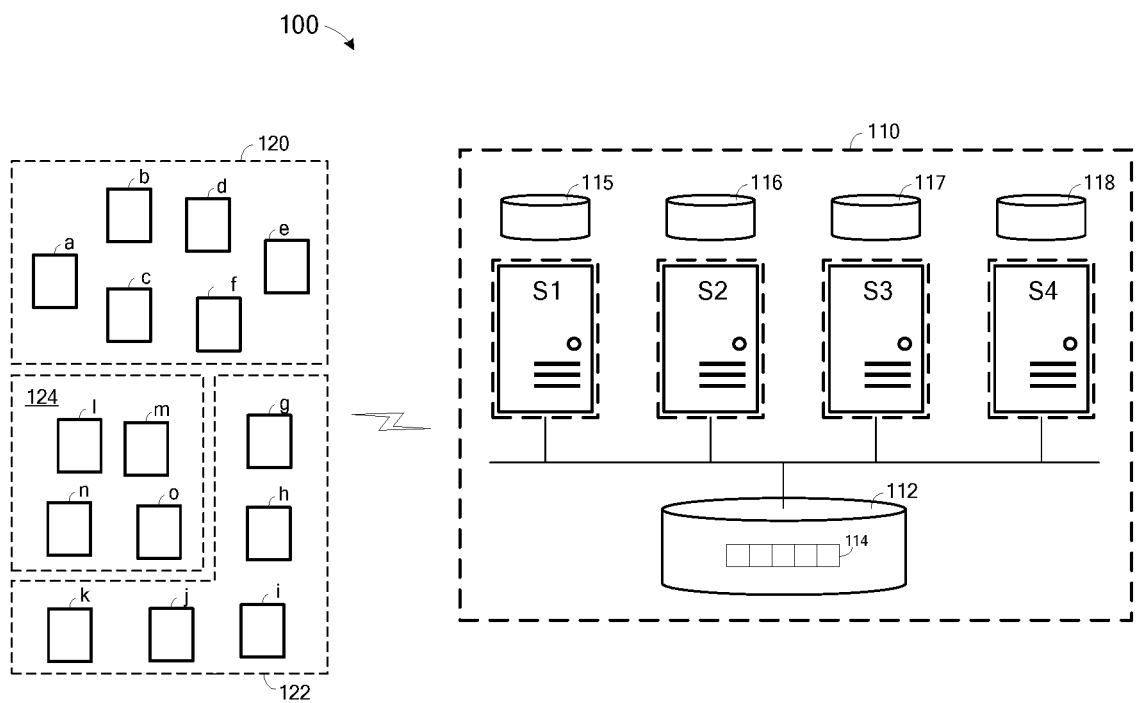
FIG. 1 is a block diagram of an Internet of Things (IoT) communication architecture including a fleet of servers according to some embodiments.

The following description is provided to enable any person in the art to make and use the described embodiments. Various modifications, however, will be apparent to those in the art.

Some embodiments address the foregoing by pre-assigning a small set of candidate servers to each IoT device partition and providing a protocol based on a consistent datastore for use by the candidate servers to elect a primary server. Embodiments also support efficient replacement of the primary server with a candidate (secondary) server if the primary server is unable to continue as the primary server.

Embodiments may further provide candidate selection using a load balancing strategy with consideration of fault domains and individual server loads. Automatic server rebalancing may occur frequently (e.g., every few minutes), with each server independently determining whether it should take on or release itself from processing load.

Some embodiments provide a decentralized approach to load balancing with high availability (i.e., a partition does not remain orphaned for too long) and fault tolerance (e.g., distribution of partition servers across fault zones). This approach may include independent evaluation, by each server, of a function indicating a point in time at which it will become eligible for the ownership of a given partition. The function may account for the state of the partition, the state of the server fleet, and the relative rank of the given server for taking ownership. This approach may provide proactive (to maintain a balanced load in the fleet) and reactive (to handle failures) load balancing using functions to evaluate relative load and to detect failures.

Some embodiments may also ensure that a server which claims partition ownership is ready to take ownership. This avoids a situation in which a central authority assigns ownership, based on stale data to a server which is no longer available to take ownership.

The number of partition moves during deployment may be reduced by using code version as a factor in the eligibility criteria. For example, if a given server is associated with code version 1 and others are associated with code version 2, the prior server will yield for a short time and then take over the partition if another server does not take over. In some instances the prior server might not yield, for example if the other servers are overloaded.

Some embodiments allow dynamically identifying and reconfiguring candidate lists for each partition individually on a control channel. Embodiments also provide multiple heartbeat channels that may be located on different architectures and protocols for failure protection. A server may drive a quorum on highly-available control channels and failover data channels as needed.

According to some embodiments, a server is able to give up partition ownership at a controlled rate and with the knowledge of the state of other servers, to ensure that another server will take ownership. A server may assess the state of the fleet continuously and reactively change the rate at which is releases partitions. Each server may know its own state by observing the number and time of received heartbeat message. A server may track both its own and other servers' heartbeat messages and designate itself or other servers as unhealthy based thereon. This mechanism allows servers to ensure their own health before acting on other servers.

FIG. 1 is a block diagram of IoT system 100 according to some embodiments. System 100 includes hub 110 and IoT devices a through o divided into logical partitions 120, 122 and 124. Hub 110 receives messages from IoT devices a through o and processes the messages using servers S1 through S4. Such processing may include consuming messages within hub 210 and routing messages to endpoints (e.g., an external stream, external storage, a distributed database) which are not shown. Implementations may include a large number (e.g., hundreds, thousands or more) of IoT devices and servers.

Hub 210 may include additional components such as a gateway to receive messages from IoT devices a through o and to route the messages to appropriate ones of servers S1 through S4. According to some embodiments, a message is received from an IoT device, the partition to which the IoT device is assigned is determined, the primary server assigned to the partition is determined, and the message is transmitted to the primary server. The primary server processes the message and inserts a corresponding entry into data stream 114 of global data store 112. For resiliency against reboots, servers S1 through S4 use embedded local data stores 115-118 backed by their filesystems. On reboot or recovery, servers S1 through S4 may determine the offset of their local copy and scan stream 114 from that point onwards to reach the current state. Local data stores 115-118 may be periodically backed-up for disaster recovery.

As will be described in detail below, a stream such as data stream 114 may be used by servers S1 through S4 to elect a primary server for each partition of system 100. As will be described below, data stream 114 supports ordering of messages inserted therein (i.e., messages are inserted at one "end" and read from another "end" of data stream 114). Datastore 112 may therefore comprise any type of data storage system accessible to each of servers S1 through S4. Datastore 112 according to some embodiments provides low-latency support of data streams, and may comprise a redundant and distributed database system. Each of servers S1 through S4 is associated with one of local data stores 115-118 as illustrated. Local data stores 115-118 may also be employed to implement an election protocol and/or load balancing according to some embodiments.

Each component described herein may be implemented by one or more computing devices (e.g., computer servers), storage devices (e.g., hard or solid-state disk drives), and other hardware as is known in the art. The components may be located remote from one another and may be elements of one or more cloud computing platforms, including but not limited to a Software-as-a-Service, a Platform-as-a-Service, and an Infrastructure-as-a-Service platform. According to some embodiments, each of servers S1 through S4 is implemented by a dedicated virtual machine.

Figure 2:
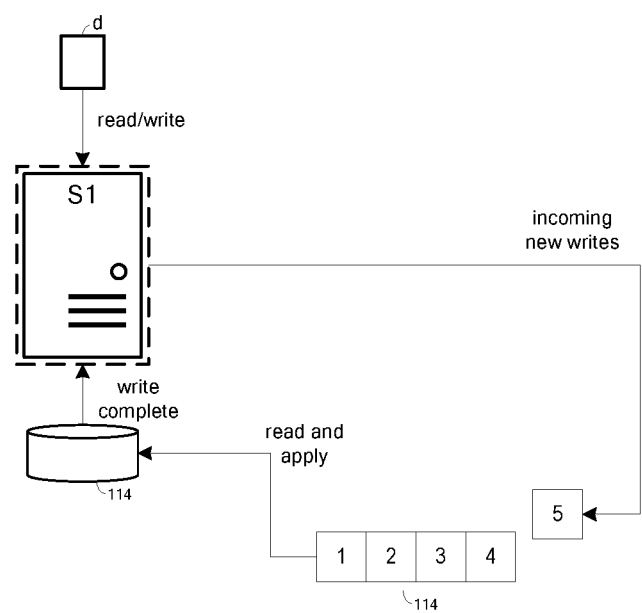
FIG. 2 illustrates operation of a primary server associated with a partition according to some embodiments.

FIG. 2 illustrates operation of a primary server associated with a partition according to some embodiments. As the primary server for partition 120, Server S1 serves all reads and writes received from devices a through f of partition 120. As shown, incoming writes are first written to stream 114. The write arrives back to the server in sequential order and is applied to local cache 115. A write is acknowledged to the client only after it is successful on local cache 115. In some embodiments, datastore 112 performs an ownership check to validate the write to stream 114. This protocol ensures that a server only acknowledges writes that are applied to its local cache. The primary server's local cache can therefore be used for consistent reads of the partition. Such an arrangement provides strong consistent reads during operation, except for during partition moves when a few reads might be served by a former primary server.

Figure 3:
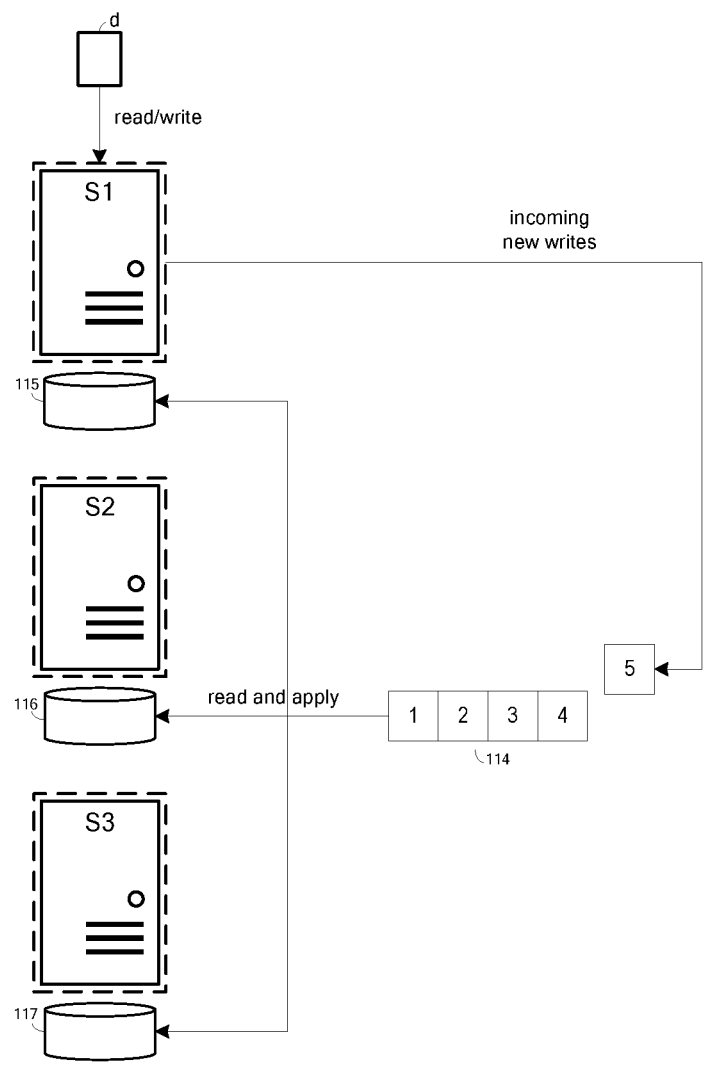
FIG. 3 illustrates operation of a primary server and secondary servers associated with a partition according to some embodiments.

FIG. 3 shows operation in a case that a primary server and multiple secondary servers are associated with a partition. As shown, secondary servers S2 and S3 sequentially read stream 114 and apply updates from the stream to their local data stores 116 and 117. As will be described below, a partition ownership record indicates the current primary and secondary servers for a given partition. When the partition ownership changes, the secondary server which takes over the partition updates the partition ownership record. All other servers notice the updated record and continue operation accordingly. The previous primary server stops serving new writes from devices of the partition and the new primary server starts serving such writes. As will also be described below, the previous primary might still serve some reads until it reads the updated partition ownership record. However, if the previous primary intentionally gave up partition ownership, updates will remain strongly consistent because any new ownership claim would be processed only after the current ownership is released.

By serializing writes using a global data store and a change stream, embodiments may eliminate many race conditions which may occur on cache invalidate and update scenarios, particularly when writes arrive out of order or systems fail mid-operation.

FIGS. 4-7 illustrate primary server election per a partition management protocol according to some embodiments. It will be assumed that a customer operates a computing device to send a request to a control/management plane (not shown) for instantiation of an IoT hub. According to the present example, the control plane instantiates a hub entity and defines a single partition. Embodiments are not limited to one partition.

Figure 4:
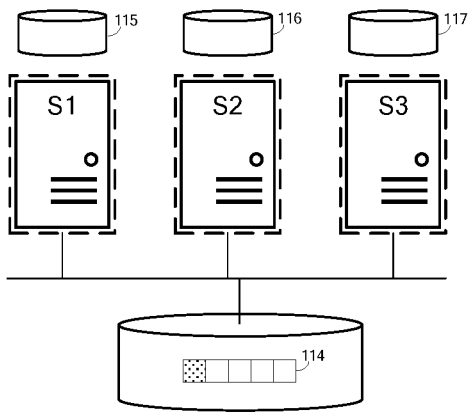
FIGS. 4-7 illustrate primary server election per a partition management protocol according to some embodiments.

The control plane also generates a partition ownership stream and identifies several candidate servers from among an available fleet of servers. The candidate servers are instructed to attach to the stream. FIG. 4 illustrates candidate servers S1, S2 and S3 and partition ownership stream 114 according to the present example. FIG. 4 also illustrates a first message placed in stream 114 by the control plane. The message specifies a partition (P1), a current owner (i.e., a primary server) of the partition (null), a new owner (null), a current unique message tag (null), and a new unique message tag (e1). The message may also include a monotonically-increasing version number. As will be described below, the version number allows a control plane to observe and loosely-order partition state changes.

Figure 5:
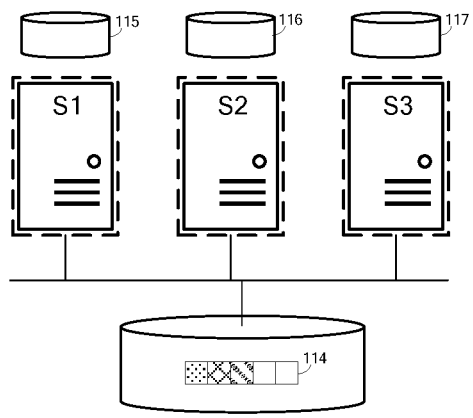

According to the present protocol, all candidate servers S1, S2 and S3 read all messages placed in stream 114 in the order of placement. Servers S1, S2 and S3 therefore read the first message and each attempts to take control of the partition P1 based on the message. In the present example, and as illustrated in FIG. 5, server S1 acts first to store a second message in stream 114 (i.e., Partition: P1, CurrentOwner: null, NewOwner: S1, curr_etag: e1, new_etag: e2). Server S2 similarly attempts to take control by inserting a third message into stream 114 (i.e., Partition: P1, CurrentOwner: null, NewOwner: S2, curr_etag: e1, new_etag: e3).

Figure 6:
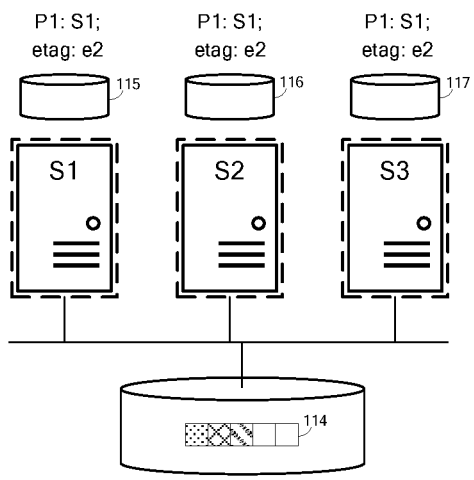

According to some embodiments, a server considers a write to stream 114 complete only after successfully reading back the data therefrom and updating its local database. For example, server S1 reads the second message and confirms that the current etag of the second message (i.e., e1) matches the new etag of the last valid message (i.e., e1). Due to the matching etags, server S1 updates local data store 115 to note that server S1 is the primary server for partition P1 and that the current etag is e2, as shown in FIG. 6. FIG. 6 also shows that servers S2 and S3 also read the second message, perform the same confirmation as server S1, updates local data stores 116 and 117 to note that server S1 is the primary server for partition P1 and that the current etag is e2.

Figure 7:
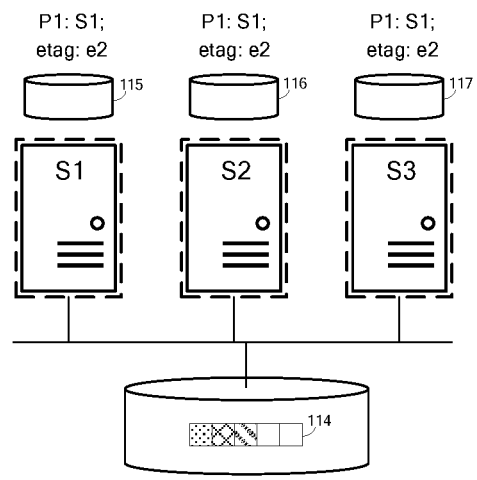

All servers then read the third message inserted by server S2 and determine that the current etag (i.e., e1) of the third message does not match the current etag noted in their corresponding local data stores (i.e., e2). The third message therefore fails and is ignored as illustrated in FIG. 7. Embodiments may therefore provide an efficient streaming implementation for leader election between two or more servers.

FIGS. 8-13 illustrate a primary server update per a partition management protocol according to some embodiments. It will be assumed that partition P1 is owned by server S1 and includes devices D1, D2 and D3. Accordingly, IoT hub 110 routes any updates received from any of devices D1, D2 and D3 to server S1.

Figures 8, 9:
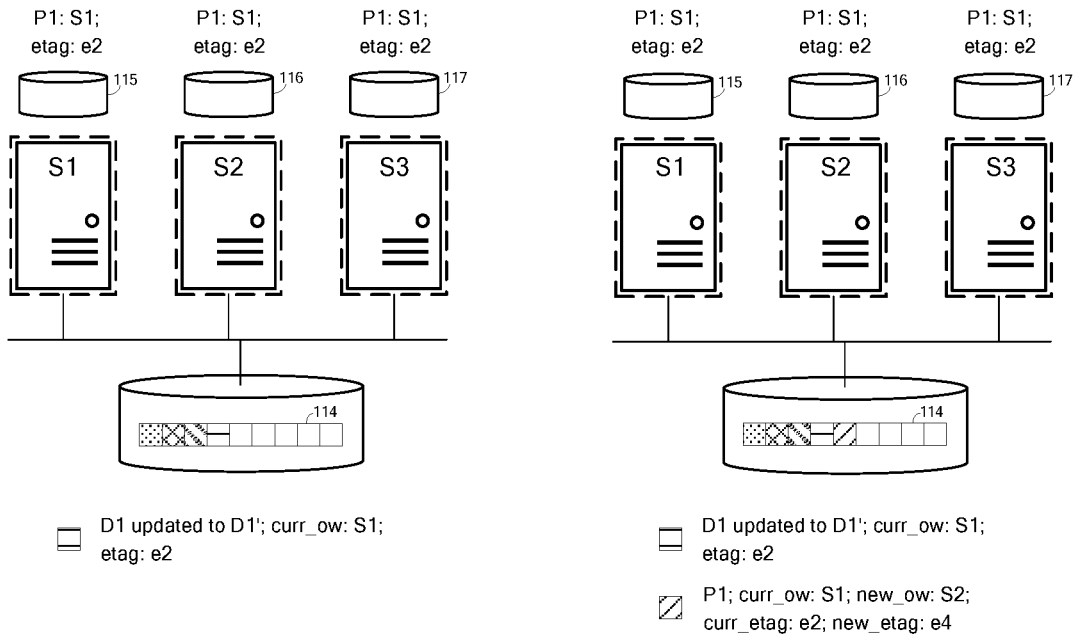
FIGS. 8-13 illustrate a primary server update per a partition management protocol according to some embodiments.

As shown in FIG. 8, an update received by device D1 is received by server S1, which inserts a message in stream 114 indicating device D1 has been updated to D1' and further indicating that server S1 is the current owner of partition P1 by virtue of the record associated with etag e2. As described above, servers S2 and S3 read this message and take no action because the ownership details of the message correspond to the ownership details of their local data stores 116 and 117.

Figure 10:
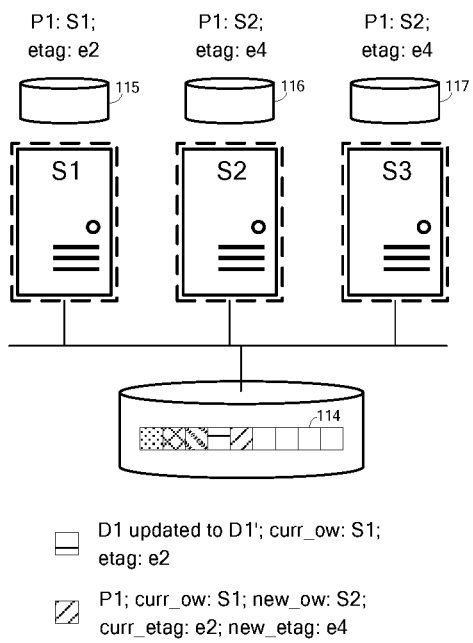

It is then assumed that server S2 determines to take ownership of partition P1. This determination may be based on load balancing considerations as described below. Server S2 therefore inserts a message into stream 114 as shown in FIG. 9 (i.e., Partition: P1, CurrentOwner: S1, NewOwner: S2, curr_etag: e2, new_etag: e4). Servers S2 and S3 read the message, confirm the specified current etag (i.e., e2) against their local data store, and update their local data store to indicate that server S2 owns partition P1 and that the current etag is e4. FIG. 10 illustrates servers S2 and S3 and their local data stores after such updates. It is assumed that server S1 has not yet read the message inserted by server S2 to change ownership of partition P1.

Figure 11:
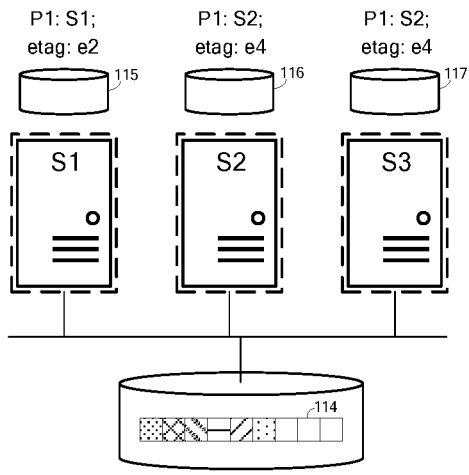
Figure 12:
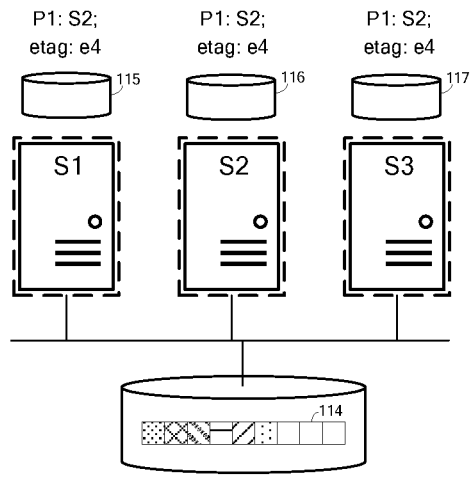
Figure 13:
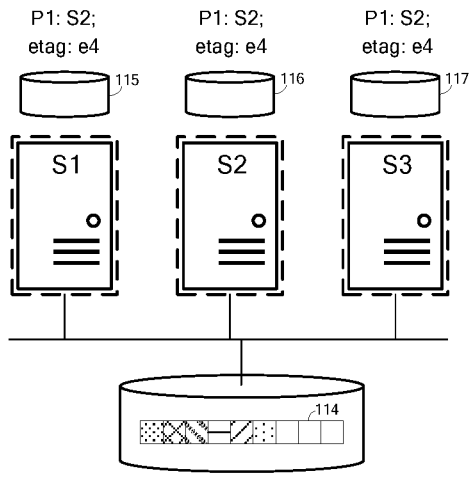

A next message received from device D1 may be sent to former partition owner server S1. FIG. 11 illustrates subsequent enqueuing of a message by server S1 indicating that device D1 has been updated to D1", as well as the current owner S1 of partition P1 (from the perspective of server S1) and current etag e2 (from the perspective of server S1). Server S1 then reads the message inserted by server S2 and updates its local data store 115 accordingly as shown in FIG. 12. As further shown in FIG. 13, all servers reject the last message inserted by server S1 because the etag of this message (i.e., e2) does not match the etag of their local data stores (i.e., e4).

The above example was described in the context of a single partition. Since each message identifies the partition to which it pertains, stream 114 may be used to write and read messages for all partitions of an IoT system. In such a case, each server ignores messages associated with partitions for which it is not a candidate server. Each server is required to read all messages of data stream 114. Moreover, if data stream 114 is down, writes halt for all data partitions hosted by hub 110.

Figure 14:
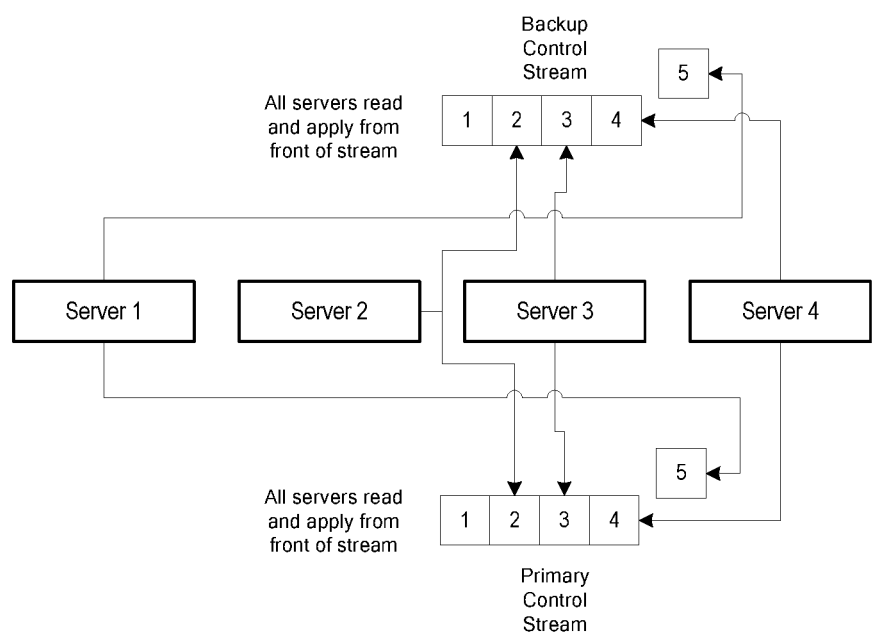
FIG. 14 illustrates two control streams according to some embodiments.

FIG. 14 illustrates a set of four servers with two control streams. Again, writes are placed on the back of stream and reads are performed from the front. Primary server election may take place on the control stream as described above with respect to the data stream. However, the primary elected on the data stream is the real primary which has control of the the data stream. This primary always reports back the final status of the election on the control stream.

Each server in the fleet therefore reads and keeps track of all messages of the control stream and is not required to read each message associated with each partition on a data stream. In one alternative, the primary server election occurs in the control channel and the winning server writes to in the data channel to claim to ownership. Such an implementation makes all servers available for the first election round, allowing better fault tolerance and load balancing. In another example, a number of candidate servers are preassigned to a partition, where the number is greater than the number of required primary and secondary servers. Primary election occurs between the preassigned candidates only, and a second background process adds and removes candidates at its own pace.

According to some embodiments, the control stream includes heartbeat messages and partition control records. All servers publish a heartbeat message on the control stream. Servers tag their heartbeat messages with a monotonic clock timestamp so that, given two heartbeat messages published by a server, other servers could identify which one is more recent and by how much time. Heartbeat messages may include data indicating whether the publishing server is alive, as well as the real-time traffic and load on the server.

When a new data partition is created, the aforementioned control plane inserts a partition record message including partition details into the control stream. All servers in the fleet read this message and begin taking primary and secondary roles as described herein. Each partition record includes a version number initially set by the control plane and subsequently incremented by future partition record messages.

FIG. 14 illustrates two control streams to ensure high availability. A same message may arrive at the two streams in different order. As heartbeat messages for a given server are written only by the given server and implicitly ordered by the timestamps generated by the given server, such ordering differences may be easily addressed. Partition records may be written by multiple servers and are therefore ordered by monotonically-increasing version number and are accurately identified by an etag check. Two servers updating the records to a same next version (e.g., from 4 to 5) might succeed in different orders in two different channels. To ensure ordering, only one of the channels is used for partition records at a given time. When a quorum of the servers agrees that a channel is down, an agreement is reached to switch to the other channel.

Figure 15:
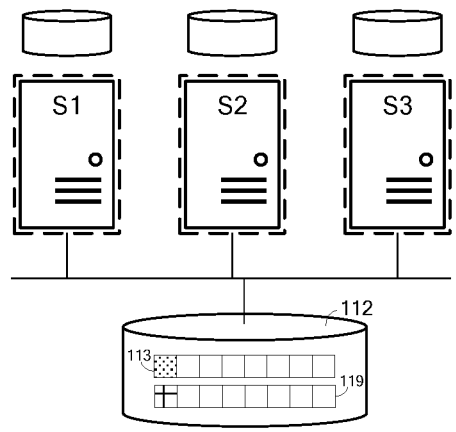
FIGS. 15-18 illustrate primary server election per a partition management protocol using a control stream and a data stream according to some embodiments.

FIGS. 15-18 illustrate addition of a new partition and primary server election using a control stream and a data stream according to some embodiments. FIG. 15 shows control stream 113 and data stream 119 of global data store 112. The control plane may use control stream 113 to send messages to the fleet of servers in order to perform load balancing and other management. All servers of IoT system attach to control stream 113 read the messages therein in sequence.

FIG. 15 shows the insertion of a message into control stream 113 (i.e., Partition: P1, CurrentOwner: null, NewOwner: null, curr_etag: null, new_etag: e1). The message includes metadata identifying stream 119, on which updates are to be posted for the subject partition (i.e., P1). Accordingly, each partition is associated with a respective data stream, which is read by the candidate servers for the partition. FIG. 15 also shows insertion by the control plane of a message into data stream 119 (i.e., Partition: P1, CurrentOwner: null, NewOwner: null, curr_etag: null, new_etag: e1).

According to some embodiments, candidate servers race for partition ownership using control stream 113 as described above with respect to stream 114. Moreover, a server claiming ownership of a particular partition must also claim ownership of the partition in the data stream (e.g., stream 119) associated with the partition.

Figure 16:
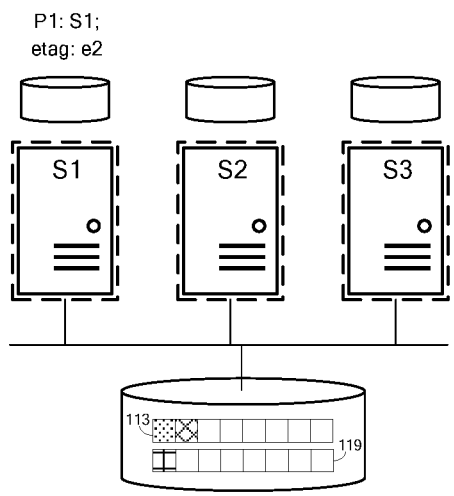

As shown in FIG. 16, server S1 claims ownership of partition P1 by inserting a corresponding message (Partition: P1, CurrentOwner: null, NewOwner: S1, curr_etag: e1, new_etag: e2, DataStrm: DS1) into control stream 113. It will be assumed that server S1 then halts without claiming ownership of corresponding data stream 119.

Figure 17:
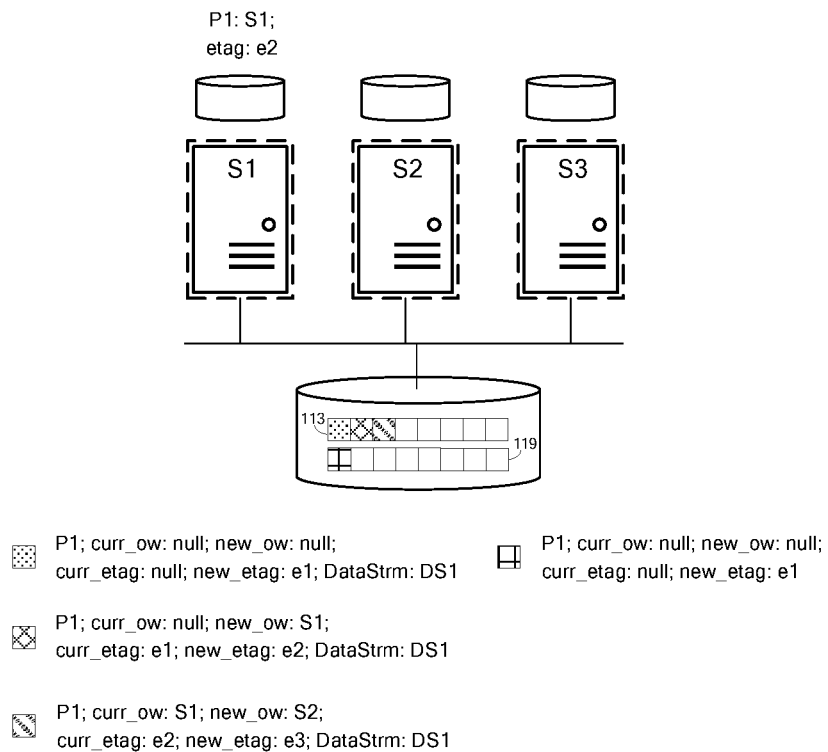
Figure 18:
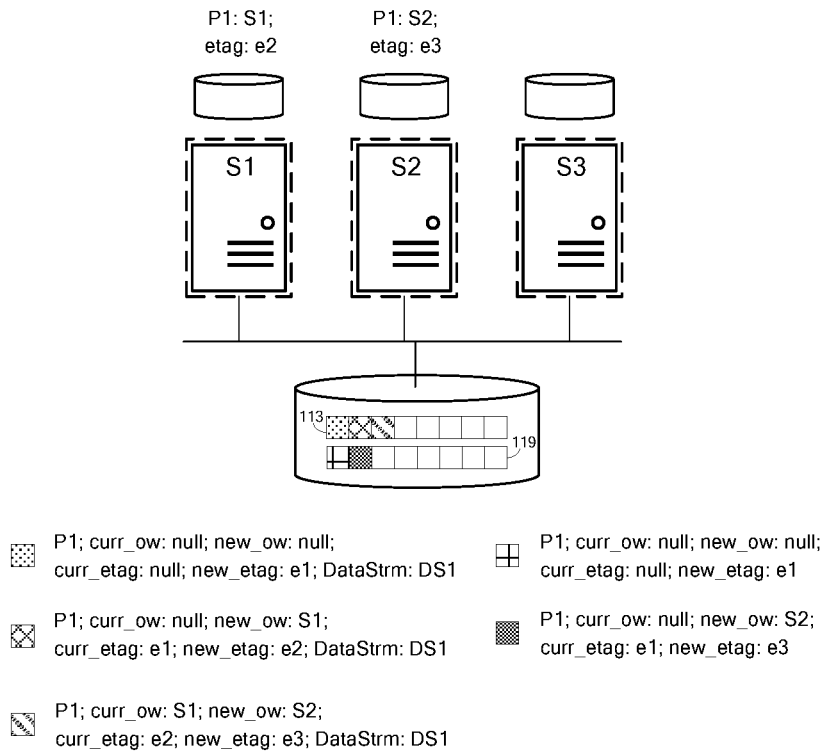

As shown in FIG. 17, server S2 then determines to claim ownership of partition P1 (e.g., via load balancing and fault detection logic) and inserts a corresponding message (Partition: P1, CurrentOwner: S1, NewOwner: S2, curr_etag: e2, new_etag: e3, DataStrm: DS1) into control stream 113. Server S2 then inserts an entry into data stream 114 (Partition: P1, CurrentOwner: null, NewOwner: S2, curr_etag: e1, new_etag: e3), as shown in FIG. 18. The specified current owner and current etag are null, e1 because server S1 did not insert an ownership message into data stream 119. Server S2 then inserts an entry into control stream 113 asserting itself as the current owner. If, at this point, server S1 attempts to perfect its ownership by inserting a message into stream 119, the message will fail because both the current owner and the current etag of the message will conflict with the actual current owner and current etag.

Figure 19:
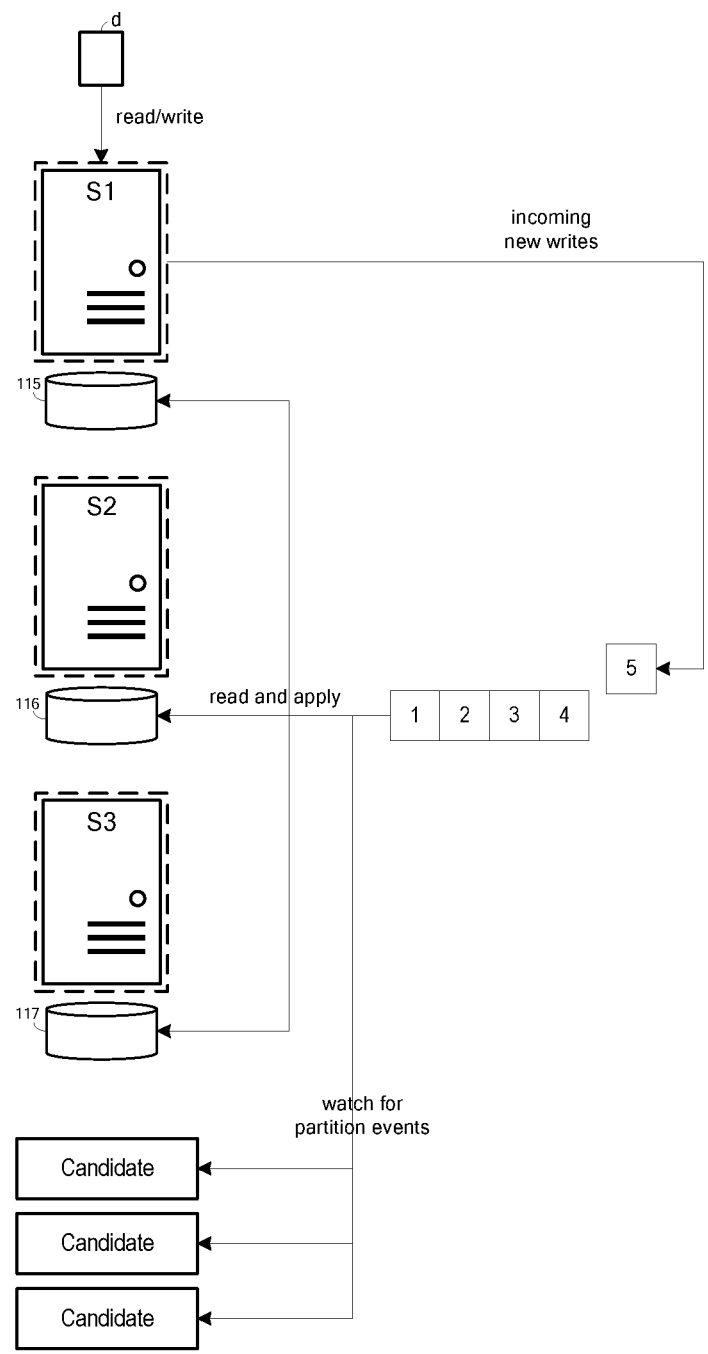
FIG. 19 illustrates operation of a primary server, secondary servers and candidate servers associated with a partition according to some embodiments.

FIG. 19 illustrates a system state after election of a primary server (i.e., S1) and two secondary servers (i.e., S2 and S3) according to some embodiments. As shown, three candidate servers are associated with the partition and have not been elected as either a primary server or a secondary server. These candidate servers do not replicate data from a data stream associated with the partition but monitor partition events of a control stream (or of a data stream if partition records are stored in the data stream as described above).

As mentioned above, creation of a new partition includes identification of candidate servers to compete for the primary server and secondary server roles. Identification of candidate servers may reduce contention in systems including many servers in the fleet.

In some implementations, the control plane creates permutations of size 'k' of all servers in the fleet, and assigns one permutation as a set of candidate servers during partition creation. Partitions may be assigned to servers using any scheme, such as but not limited to consisting hashing. Alternatively, candidate selection may be performed using the secondary and primary election algorithm described below. Either approach may seek to ensure that servers of a set of candidate servers are from different fault domains (various datacenters, power, network or rack infrastructure) so that two or more are unlikely to fail at a same time. The following partition record specifies six candidate servers, two in each fault zone A, B and C:

{paritionId : P1,
 primary : null,
 candidates : {A1, B1, C1, A2, B2, C2},
 version_number : 1000,
 e_tag : e1,
 data_stream: DS1, offset: Of1}

Figure 20:
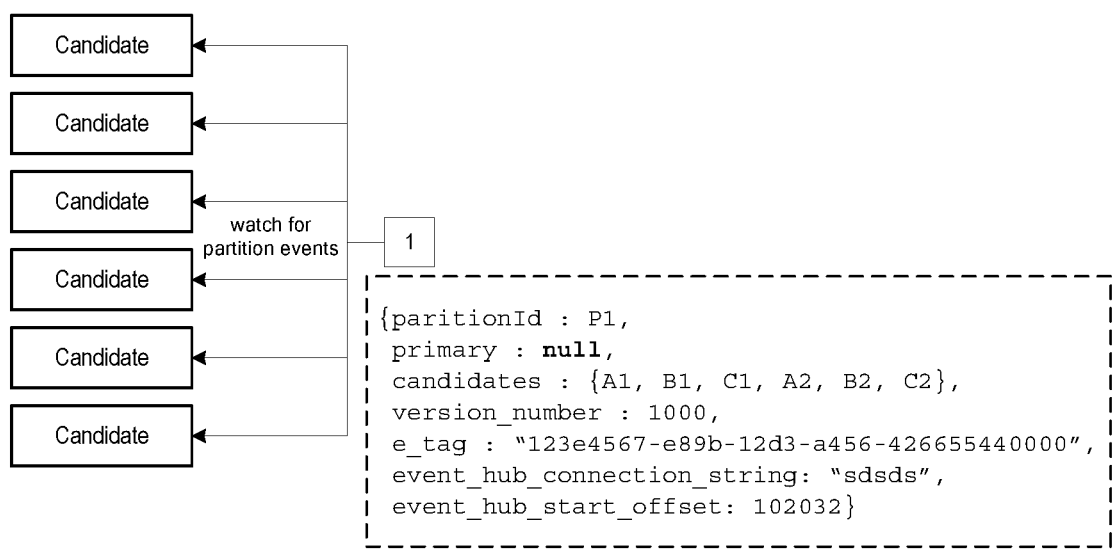
FIG. 20 illustrates a partition record after partition creation and candidate servers according to some embodiments.

In response to insertion of the record into the control stream, each candidate server connects to the given data stream (i.e., DS1 and begins observing the stream from the specified offset position (i.e., On). As shown in FIG. 20, the first message in the data stream includes the same partition control record that was inserted into the control stream. Primary and secondary server election then proceeds.

In some embodiments, all servers in the candidate list independently determine their rank among all other servers for becoming the primary. This ranking may account for server load, correlation between partitions and code version as will be described later. If a server determines it is not the highest ranked server, it may yield for a short period in order to provide time for the other servers to take over the primary server role. If after that duration no server has become the primary server, the yielding server takes over the primary role. The amount of delay may be based on a relative rank. In practice, the most eligible server typically becomes the primary server. This approach minimizes the time a partition is orphaned while still achieving desirable load balancing.

For example, is it assumed that server A1 was determined to be the highest-ranked and server B1 was determined to be the second-highest ranked. Server A1 is not responding, so server B1 takes over the partition's primary server role. The updated partition record is as follows:

{paritionId : P1,
 primary : B1,
 candidates : {A1, B1, C1, A2, B2, C2},
 version number : 1001,
 e_tag : e2,
 data_stream: DS1,
 offset: Of1}

All servers may then determine their respective ranks to identify secondary servers. Again, based on rank, servers yield to other servers and then attempt to obtain a secondary server role. This process continues until the targeted number of secondary servers is achieved. In some embodiments, establishing the targeted number of secondary servers is a higher priority than meeting fault zone criteria. For example, if all servers in a given fault zone are down, the targeted number of secondary servers should still be elected. The following record shows no secondary server from fault zone C1:

{paritionId : P1,
 primary : B1,
 secondaries : {B2, A1},
 candidates : {A1, B1, C1, A2, B2, C2},
 version_number : 1005,
 e_tag : e4,
 data_stream: DS1, offset: Of1}

The partition record may gradually move towards a better fault zone distribution. Secondary server B2 is from the same fault zone as primary server B1. Servers C1 and C2 may then determine that they are higher ranked than server B2. Assuming server C1 is higher ranked than server C2, C1 joins the secondary list and warms up its local data cache by processing messages from the data stream assigned to the partition, resulting in the following record:

{paritionId : P1,
 primary : B1,
 secondaries: {B2, A1, C1},
 candidates : {A1, B1, C1, A2, B2, C2},
 version_number : 1007,
 e_tag : e5,
 data_stream: DS1,
 offset: Of1}

Server B2 reads this record, determines it is no longer needed as a secondary server, and leaves the secondary server role. The partition record now reads:

{paritionId : P1,
 primary : B1,
 secondaries: {A1, C1},
 candidates : {A1, B1, C1, A2, B2, C2},
 version_number : 1009,
 e_tag : e6,
 data_stream: DS1, offset: Of1}

If the primary server fails, all candidate servers determine their respective rank for the primary server role. Current secondary servers may rank higher than other candidate servers as they have been previously replicating the stream data. If a candidate server wins the primary server role despite the above, it may download a back-up of the partition data, catch up on the data stream and start serving reads and writes.

During operation, the primary server continues to publish updated partition records to the control stream so that all candidate servers, non-candidate servers and the control plane are aware of partition activity.

In a multi-partition scenario, each partition is individually acquired and managed as described above. As long as consistent heartbeats are arriving from the primary server and any secondary servers, the system remains in a steady state. However, a server might experience a sudden failure or might be required to go offline for maintenance or upgrades.

During maintenance and upgrades, it may be desirable to release partitions from a server at a controlled rate. To gracefully release partitions, a primary server may update the partition record to set the new primary server as null, and allow one of the secondary servers to take over. In some cases, the primary server may downgrade itself to a secondary server to minimize data movement. For example, given the following partition record:

```
{paritionId : P1,
 primary : B1,
 secondaries: {A1, C1},
 candidates : {A1, B1, C1, A2, B2, C2},
 version_number : 1009,
 e_tag : e1,
 data_stream: DS1,
 offset: Of1}
```

B1 may determine to release partition P1 and become a secondary server:

```
{paritionId : P1,
 primary : NULL,
 secondaries: {A1, C1, B1},
 candidates : {A1, B1, C1, A2, B2, C2},
 version_number : 1010,
 e_tag : e2,
 data_stream: DS1,
 offset: Of1}
```

After reading the partition record and determining that the partition has no owner, all servers rank themselves and try to become primary as described above. Assuming A1 becomes the primary server as it was highest-ranked, it also removes itself from its secondary server role:

```
{paritionId : P1,
 primary : A1,
 secondaries: {C1, B1},
 candidates : {A1, B1, C1, A2, B2, C2},
 version_number : 1012,
 e_tag : e3,
 data_stream: DS1,
 offset: Of1}
```

All partitions may be removed from a server in this manner during planned maintenance. For example, the control plane sends a signal to the server asking it to drain all partitions. The server marks itself as unavailable in its health record so that other servers do not assume it is available to take new load. The server then releases its partitions at a configured rate. This approach may ensure that a server or the fleet is not overwhelmed with partition movements. The control plane observes the partition count on server heartbeat and, once it drops to zero, the control plane proceeds with the server maintenance.

Server failures may be detected either by missed heartbeats or by external monitoring systems in the control plane using metrics such as client failure rate, etc. In the latter case, the control plane may send a signal to the control stream indicating that a server is down. All other servers read this message and set the last heartbeat time for the down server to zero, effectively mapping the latter case to the former missing heartbeat case.

Failure detection due to missed heartbeats includes determining a period of missed heartbeat messages which should constitute a failed server. The period may depend on the partition move cost and expected recovery time for the server. For example, if it takes five seconds to move a partition to a secondary server and reroute all client messages to the new server, then two seconds of missed heartbeat messages should not be sufficient to determine a server failure. Models may be developed based on historical data to determine an appropriate period in the context of an ongoing outage, instead of using a static value.

For example, if a server stopped responding after exhibiting more than 90% memory utilization, then historical data might suggest the process crashed due to an out of memory issue. Since recovery from such an issue is generally fast, it is determined not to initiate a partition move. If a server was exhibiting healthy metrics and suddenly stopped responding, then historical data might suggest a network or power outage. A partition move may be initiated in such a case, as recovery from such events may take tens of seconds.

It may be desirable to move partitions for reasons other than server failure, such as for load balancing (e.g., moving partitions from an overloaded server to a server with less load), for distribution of corelated workload (e.g., moving corelated partitions) and to pin a certain partition to a certain server for isolation.

A missing heartbeat may therefore be only one factor in the determination of whether or not to move a partition. According to some embodiments, the decision to failover a partition occurs at the partition level. The determination may be based on a function which accounts for several factors ranging from the load on servers to instructions from the control plane. Each server may perform this determination separately to avoid a central point of failure. The determination might not only include a determination of whether the partition should be moved, but also may account for the server's own eligibility to take over the partition. The function may outputs a timestamp of the server's monotonic clock after which it should initiate the partition move. An example of the components of this function according to some embodiments follows:

Metrics representing the current state of the partition:

$P_{load}$=Metric showing the load on the primary server (may include multiple values associated with memory, network, etc.). As will be described below, this metric may be used for load assessment and rebalancing.

$P_{correlation}$=Metric showing corelated partitions on the primary server.

$P_{code\_version}$=The code version running on the primary server.

$P_{heart\_beat\_time}$=Time stamp of when the primary server for the partition last sent a heartbeat.

$P_{last\_partition\_move}$=Metric accounting for how often this partition has moved, to avoid moving a partition too often for load balancing.

Metrics representing the current state of the fleet:

$F_{load}$=Metric showing the load on the primary server (may include multiple values for memory, network, etc.)

$F_{correlation}$=Metric showing the load-corelated partitions across the fleet.

$F_{code\_version}$=The code version running on various servers of the fleet.

$F_{heart\_beat\_time}$=The time all other servers in the fleet sent their heartbeat.

$F_{last\_partition\_move}$=Metric accounting for how often the partition has moved, to avoid moving a partition too often for load balancing.

Metrics representing the current state of the target server evaluating the partition move:

$T_{load}$=Metric showing the load on the target server (could be multiple value for memory, network etc.)

$T_{correlation}$=Metric showing the corelated partitions on the target server.

$T_{code\_version}$=The code version running on the target server. The higher the code version the greater the eligibility.

$T_{heart\_beat\_time}$=The last time the target server received its own heartbeat. To avoid moving partition when it is itself disconnected.

$T_{role}$=The role of target server on the partition. The secondary server should initiate the move before other servers.

$T_{tokens}$=Rate limiter tokens of the target server for initiating the move.

Accordingly, in some embodiments, time_to_initiate_move=f($P_{load}$, $P_{correlation}$, $P_{cover\_version}$, $P_{heart\_beat\_time}$, $P_{last\_partition\_move}$, $F_{load}$, $F_{correlation}$, $F_{cover\_version}$, $F_{heart\_beat\_time}$, $T_{load}$, $T_{correlation}$, $T_{cover\_version}$, $T_{heart\_beat\_time}$)

According to the above function, each metric is used to detect deviation of the primary server and target server from the fleet. If the primary server is overloaded as compared to the fleet or the target server is significantly underloaded as compared to the fleet, the time_to_initiate_move will be lower than otherwise. If the code version on the target server is older than rest of the fleet, the time_to_initiate_move will be greater than otherwise. Some of the metrics may be evaluated by calculating metrics for the fleet and then checking the number of standard deviations of a given server from the average value in the fleet.

According to some embodiments, each server maintains a list of all partitions grouped by the current primary server name. When a heartbeat for another server is read from the control stream, the server updates the last heartbeat time for all partitions owned by that server, effectively renewing ownership of the server over all of its existing partitions. Each server uses its own monotonic clock to track the time of the last received heartbeat.

When the server reads its own heartbeat from the control stream, which is tagged as described above with its own monotonic clock, the server can determine how far behind it is from the head of the control stream. For example, if the server reads its own heartbeat from one hour ago then it may be determined to bee lagging too far behind the other servers and may skip the following steps. Otherwise, the following steps are performed to evaluate and, if necessary, to take over other server's partitions.

In some examples, every x milliseconds, the server goes through the list of all partitions and performs the following steps for each partition. First, if the heartbeat associated with the partition has not expired, it moves on to the next partition. If the heartbeat has expired, the server releases the partition by marking primary as null as described above. A rate control (e.g., a token bucket) may be used to ensure a server does not release too many partitions at once. Next, the primary election algorithm executes as described above to ensure the most-eligible server becomes the new primary server for the partition.

In a specific example, it is assumed that a server is considered down if it has not sent a heartbeat for 10 units of time (seconds, milliseconds, etc.). The threshold could vary. It is also assumed that the current monotonic time of server S1 is 100, the timestamp of the last read heartbeat message of server S1 is 90, the timestamp (on server S1's clock) of the last read heartbeat message of server S2 is 89, and the timestamp (on server S1's clock) of the last read heartbeat message of server S3 is 82. In such a case, no partitions would be moved because server S1 is too far behind on its own heartbeat to evaluate the heartbeats of servers S2 and S3. Specifically, server S1 can only determine that server S3 has not sent a heartbeat for at least 8 (i.e., 90-82) units of time.

In another example, it is assumed that the current monotonic time of server S1 is 100, the timestamp of the last read heartbeat message of server S1 is 98, the timestamp (on server S1's clock) of the last read heartbeat message of server S2 is 95, and the timestamp (on server S1's clock) of the last read heartbeat message of server S3 is 82. It may be determined to move partitions from server S3 because server S1 can determine that server S3 has not sent a heartbeat for at least 16 (i.e., 98-82) units of time.

Load balancing according to some embodiments may take many forms. Each server may check for any changes in the system periodically by reading the latest information from global data store 119. Rebalancing may occur automatically every few minutes with each server independently determining whether it is able to handle an additional processing load or whether it should shed processing load. Rebalancing may be triggered by an external entity or service which has a global view of the system.

In some embodiments, each server issues messages characterizing its load and health, and these messages are available to each other server. Each partition is associated with a certain load which may be a function of the number of total devices or connected devices in that partition. Similarly, the load on a server may be a function of the total number of partitions and the partitions for which it is a primary. Each server is also associated with a certain capacity above which it cannot assume the load of any more partitions. The available capacity of a server may therefore be determined by subtracting the total server load from the capacity of the server. A system may be considered load-balanced if the available capacities of each server are within a certain threshold from one another.

Each partition may be associated with a globally-available record indicating its load on the system. The record may be updated periodically to reflect the current load of the partition. The record for a partition may be updated by the current primary server for the partition or by an external service. The record may be merged with the record of the control data stream establishing partition ownership in some embodiments. One example of such a record is as follows:

```
{
  partitionId : P1,
  load : {
    totalDevices: 50,
    connectedDevices: 25,
    latencyInMs: 20
  }
}
```

Each server may also be associated with a record indicating its health, load and capacity. Each server may update the record periodically or whenever it changes its role for any partition. According to one example:

```
{
  serverId : S1,
  ttl : T,
  currentLoad : {
    primaryPartitions : 200,
    secondaryPartitions : 1000,
    candidatePartitions : 2000,
    cpuPercent : 50,
    memoryInGB : 20,
    openPortCount : 400
  },
  totalCapacity : {
    totalPartitions : 5000,
    totalMemoryInGB : 80,
    totalPortCount : 60000
  }
}
```

According to some embodiments, when a server receives a notification for a partition record, it checks the partition record to determine whether a minimum number of candidate servers are associated with the partition. If not, and the server has capacity to take ownership of the partition if required, the server will add itself to the candidate list of the partition and update the record.

Each server may periodically read each server record and calculate the average "available" capacity across all servers in the system. If the server's "available" capacity is substantially lower than the average, it may remove itself from the candidate list of one or more partitions. The server may also determine to not renew the lease of a partition for which it is primary and remove itself as the primary server of the partition record. Consequently, a change notification may be delivered to other servers which may then decide to add themselves to the candidate list or promote themselves to the secondary list. If the "available" capacity of the server is much substantially than the average, then the server may proactively attempt to add itself as a candidate server to any partition records which do not specify a minimum number of candidate servers.

During operation, a server may stop performing its operations successfully for various reasons such as low availability of resources, network connectivity loss, unhandled exceptions, power failure, etc. According to some embodiments, each server is aware of which other servers exist in the system and of when a server comes online or goes offline. The servers also know which partitions exist in the system and when a partition is added or removed. This awareness may be achieved by having every server scan the set of partition and server records periodically. Since the latency to detect a change in this manner may be unsuitably high, the control stream may be used to generate a notification in response to any change in the partition or server records. Each server listens to these notifications and takes appropriate action.

According to some embodiments, each server tracks, for each partition of which it is aware, the last heartbeat, code version and state of the partition's primary server. Also tracked may be the server fleet code version, the load on the fleet, the load and code version of each server in the fleet, and the partition distribution. Based on these factors, and for each partition, each server determines whether it should take over ownership from the partition's primary server.

The factors are used to determine a server-specific time at which a server should take over ownership from the partition's primary server. Generally, the server takes over the partition if the time is in the past and does not take over the partition if the time is in the future. The server determines a time of its last read heartbeat to determine whether its read data is up to date. The function may compute the takeover time as a certain time period (e.g., +6) from a last read heartbeat of the partition's primary server, and then may adjust that time based on any of the above and/or other factors. For example, the time may be calculated as T=15 based on a last heartbeat of the primary server received at T=9, and the time may be reduced if the primary server is overloaded (e.g., −2) or if the primary server is unhealthy (e.g., −6), and increased if it is a secondary for the partition (e.g., +2), if it is running a new code version (e.g., +1). Each server regularly recalculates a server-specific time at which it should takeover as primary server for each partition, and this time may be differ among the servers based on individual server-specific factors.

Figure 21:
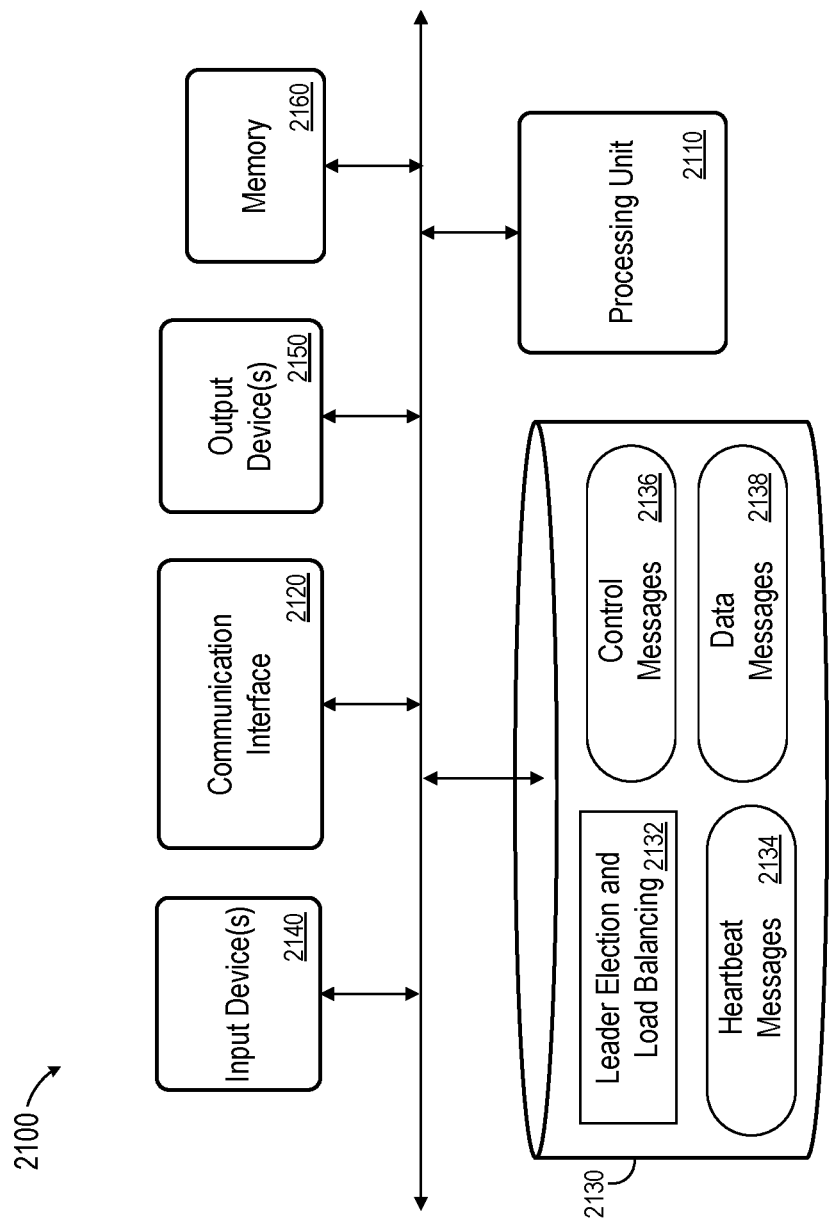
FIG. 21 is a block diagram of a computing system according to some embodiments.

FIG. 21 is a block diagram of system 2100 according to some embodiments. System 2100 may comprise a computing server of a fleet of servers of an IoT hub as described herein. System 2100 may be implemented by a cloud-based virtual server according to some embodiments.

System 2100 includes processing unit 2110 operatively coupled to communication device 2120, persistent data storage system 2130, one or more input devices 2140, one or more output devices 2150 and volatile memory 2160. Processing unit 2110 may comprise one or more processors, processing cores, etc. for executing program code. Communication interface 2120 may facilitate communication with external devices, such as client devices, and data providers as described herein. Input device(s) 2140 may comprise, for example, a keyboard, a keypad, a mouse or other pointing device, a microphone, a touch screen, and/or an eye-tracking device. Output device(s) 2150 may comprise, for example, a display (e.g., a display screen), a speaker, and/or a printer.

Data storage system 2130 may comprise any number of appropriate persistent storage devices, including combinations of magnetic storage devices (e.g., magnetic tape, hard disk drives and flash memory), optical storage devices, Read Only Memory (ROM) devices, etc. Memory 2160 may comprise Random Access Memory (RAM), Storage Class Memory (SCM) or any other fast-access memory.

Leader election and load balancing component 2132 may comprise program code executed by processing unit 2110 to cause system 2100 to execute the leader election and load balancing protocols as described herein. According to some embodiments, each server of the fleet of servers executes the same protocols in order to reduce a need for centralized control. Heartbeat messages 2134, control messages 2136 and data messages 2138 may comprise locally-store messages to facilitate the processes described herein. Data storage device 2130 may also store data and other program code for providing additional functionality and/or which are necessary for operation of system 2100, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A computer-implemented system comprising:
   a first server system comprising a first data store;
   a second server system comprising a second data store; and
   a common data store storing a first data structure accessible to the first server system and to the second server system, the first data structure storing a first message indicating a first partition of a plurality of devices and a first current message tag,
   the first server system to attempt to establish the first server system as a primary server of messages received from the first partition by storing a second message in the first data structure, the second message indicating the first partition, the first server system, the first current message tag and a first new message tag,
   the second server system to attempt to establish the second server system as the primary server system of messages received from the first partition by storing a third message in the first data structure after the storage of the second message in the first data structure, the third message indicating the first partition, the second server system, the first current message tag and a second new message tag,
   the first server system to read the second message, to determine that the first current message tag of the first message is identical to the first current message tag of the second message, and, in response to the determination that the first current message tag of the first message is identical to the first current message tag of the second message, store first data in the first data store identifying the first server system as the primary server of messages received from the first partition, and identifying the first new message tag, and
   the first server system to read the third message after reading the second message, to determine that the first current message tag of the third message is different from the first new message tag of the first record stored in the first data store, and, in response to the determination that the first current message tag of the third message is different from the first new message tag of the first record stored in the first data store, determine that the third message is invalid.

2. A computer-implemented system according to claim 1, the second server system to read the second message, to determine that the first current message tag of the first message is identical to the first current message tag of the second message, and, in response to the determination that the first current message tag of the first message is identical to the first current message tag of the second message, store second data in the second data store identifying the first server system as the primary server of messages received from the first partition, and identifying the first new message tag, and
   the second server system to read the third message after reading the second message, to determine that the first current message tag of the third message is different from the first new message tag of the second record stored in the second data store, and, in response to the determination that the first current message tag of the third message is different from the first new message tag of the first record stored in the first data store, determine that the third message is invalid.

3. A computer-implemented system according to claim 2, further comprising:
   a third server system comprising a third data store storing data identifying the first server system as the primary server of messages received from the first partition, and identifying the first new message tag,
   the third server system to attempt to establish the third server system as the primary server system of messages received from the first partition by storing a fourth message in the first data structure after the storage of the third message in the first data structure, the fourth message indicating the first partition, the third server system, the second current message tag and a third new message tag, and
   the first server system to read the fourth message, to determine that the second current message tag of the fourth message is identical to the first current message tag of the first message, and, in response to the determination that the second current message tag of the fourth message is identical to the first current message tag of the first message, store fourth data in the first data store identifying, the third server system as the primary server of messages received from the first partition, and identifying the third new message tag.

4. A computer-implemented system according to claim 1, further comprising:
   a third server system comprising a third data store storing data identifying the first server system as the primary server of messages received from the first partition, and identifying the first new message tag,
   the third server system to attempt to establish the third server system as the primary server system of messages received from the first partition by storing a fourth message in the first data structure after the storage of the third message in the first data structure, the fourth message indicating the first partition, the third server system, the second current message tag and a third new message tag, and
   the first server system to read the fourth message, determine that the second current message tag of the fourth message is identical to the current message tag of the first message, and, in response to the determination that the second current message tag of the fourth message is identical to the first current message tag of the first message, store third data in the first data store identifying the third server system as the primary server of messages received from the first partition, and identifying the third new message tag.

5. A computer-implemented system according to claim 1, the common data store storing a second data structure accessible to the first server system and to the second server system, the second data structure to store updates received from the plurality of devices of the first partition.

6. A computer-implemented system according to claim 5, the first server system and the second server system to periodically store heartbeat messages in the first data structure.

7. A computer-implemented system according to claim 1, the second server system to determine to add the second server system as a secondary server system of the first partition and, based on the determination, to store a fourth message in the first data structure identifying the first server system as the primary server of messages received from the first partition, the first new message tag, and the second server system as the secondary server system of messages received from the first partition.

8. A computer-implemented system according to claim 7, wherein the determination to add the second server system as a secondary server system comprises determination of a load on the second server system.

9. A computer-implemented system according to claim 7, wherein the determination to add the second server system as a secondary server system comprises determination of a fault domains of each other secondary server system of the first partition.

10. A computer-implemented system according to claim 1, wherein the first server system and the second server system are two of three or more candidate server systems associated with the first partition and indicated in the first message stored in the first data structure.

11. A computer-implemented system according to claim 10, wherein each of the candidate server systems periodically stores a respective server health record in the first data structure.

12. A computer-implemented method comprising:
    storing a first message in a first data structure of a common data store, the first message indicating a first partition of a plurality of devices and a first current message tag;
    storing, by a first server system and to attempt to establish the first server system as a primary server of messages received from the first partition, a second message in the first data structure, the second message indicating the first partition, the first server system, the first current message tag and a first new message tag;
    storing, by a second server system and to attempt to establish the second server system as the primary server system of messages received from the first partition, a third message in the first data structure after the storage of the second message in the first data structure, the third message indicating the first partition, the second server system, the first current message tag and a second new message tag;
    reading the second message by the first system;
    determining, by the first server system, that the first current message tag of the first message is identical to the first current message tag of the second message, and, in response to the determination that the first current message tag of the first message is identical to the first current message tag of the second message, storing first data in the first data store identifying the first server system as the primary server of messages received from the first partition, and identifying the first new message tag;
    reading the third message by the first system after reading the second message; and
    determining, by the first server system, that the first current message tag of the third message is different from the first new message tag of the first record stored in the first data store, and, in response to the determination that the first current message tag of the third message is different from the first new message tag of the first record stored in the first data store, determining that the third message is invalid.

13. A computer-implemented method according to claim 12, further comprising:
    reading the second message by the second server system;
    determining, by the second server system, that the first current message tag of the first message is identical to the first current message tag of the second message, and, in response to the determination that the first current message tag of the first message is identical to the first current message tag of the second message, storing second data in the second data store identifying the first server system as the primary server of messages received from the first partition, and identifying the first new message tags;
    reading, by the second system, the third message after reading the second message; and
    determining, by the second server system, that the first current message tag of the third message is different from the first new message tag of the second record stored in the second data store, and, in response to the determination that the first current message tag of the third message is different from the first new message tag of the first record stored in the first data store, determine that the third message is invalid.

14. A computer-implemented method according to claim 13, further comprising:
    storing, in a third data store of a third server system, data identifying the first server system as the primary server of messages received from the first partition, and identifying the first new message tag;
    storing, by the third server system and to attempt to establish the third server system as the primary server system of messages received from the first partition, a fourth message in the first data structure after the storage of the third message in the first data structure, the fourth message indicating the first partition, the third server system, the second current message tag and a third new message tag;
    reading the fourth message by the first server system; and
    determining, by the first server system, that the second current message tag of the fourth message is identical to the first current message tag of the first message, and, in response to the determination that the second current message tag of the fourth message is identical to the first current message tag of the first message, storing fourth in the first data store identifying the third server system as the primary server of messages received from the first partition, and identifying the third new message tag.

15. A computer-implemented method according to claim 12, further comprising:
    storing, in a third data store of a third server system, data identifying the first server system as the primary server of messages received from the first partition, and identifying the first new message tag;
    storing, by the third server system to attempt to establish the third server system as the primary server system of messages received from the first partition a fourth message in the first data structure after the storage of the third message in the first data structure, the fourth message indicating the first partition, the third server system, the second current message tag and a third new message tag;

reading the fourth message by the first server system; and determining, by the first server system, that the second current message tag of the fourth message is identical to the current message tag of the first message, and, in response to the determination that the second current message tag of the fourth message is identical to the first current message tag of the first message, storing third data in the first data store identifying the third server system as the primary server of messages received from the first partition, and identifying the third new message tag.

16. A computer-implemented method according to claim 12, further comprising:

defining in the common data store a second data structure accessible to the first server system and to the second server system, the second data structure to store updates received from the plurality of devices of the first partition.

17. A computer-implemented method according to claim 12, further comprising:

determining, by the second server system, to add the second server system as a secondary server system of the first partition based on a load on the second server system and fault domains of each other secondary server system of the first partition, and, based on the determination, storing a fourth message in the first data structure identifying the first server system as the primary server of messages received from the first partition, the first new message tag, and the second server system as the secondary server system of messages received from the first partition.

18. A computer-implemented system according to claim 12, wherein the first server system and the second server system are two of three or more candidate server systems associated with the first partition and indicated in the first message stored in the first data structure, further comprising:

periodically storing, by each of the candidate server systems, a respective server health record in the first data structure.

19. A computer-readable medium storing processor-executable process steps, the steps executable to:

store a first message in a first data structure of a common data store, the first message indicating a first partition of a plurality of devices and a first current message tag;

store, by a first server system and to attempt to establish the first server system as a primary server of messages received from the first partition, a second message in the first data structure, the second message indicating the first partition, the first server system, the first current message tag and a first new message tag;

store, by a second server system and to attempt to establish the second server system as the primary server system of messages received from the first partition, a third message in the first data structure after the storage of the second message in the first data structure, the third message indicating the first partition, the second server system, the first current message tag and a second new message tag;

read the second message by the first system;

determine, by the first server system, that the first current message tag of the first message is identical to the first current message tag of the second message, and, in response to the determination that the first current message tag of the first message is identical to the first current message tag of the second message, storing first data in the first data store identifying the first server system as the primary server of messages received from the first partition, and identifying the first new message tag;

read the third message by the first system after reading the second message; and determine, by the first server system, that the first current message tag of the third message is different from the first new message tag of the first record stored in the first data store, and, in response to the determination that the first current message tag of the third message is different from the first new message tag of the first record stored in the first data store, determining that the third message is invalid.

20. A medium according to claim 19, the processor-executable process steps executable to:

read the second message by the second server system;

determine, by the second server system, that the first current message tag of the first message is identical to the first current message tag of the second message, and, in response to the determination that the first current message tag of the first message is identical to the first current message tag of the second message, storing second data in the second data store identifying the first server system as the primary server of messages received from the first partition, and identifying the first new message tag;

read, by the second system, the third message after reading the second message; and determine, by the second server system, that the first current message tag of the third message is different from the first new message tag of the second record stored in the second data store, and, in response to the determination that the first current message tag of the third message is different from the first new message tag of the first record stored in the first data store, determine that the third message is invalid two or more of the candidate servers to establish themselves as secondary servers of the first partition using the first stream, and the secondary servers to monitor read and write updates inserted by the primary server into the second stream and to update respective local data stores based on the updates.

* * * * *